Figure 1:
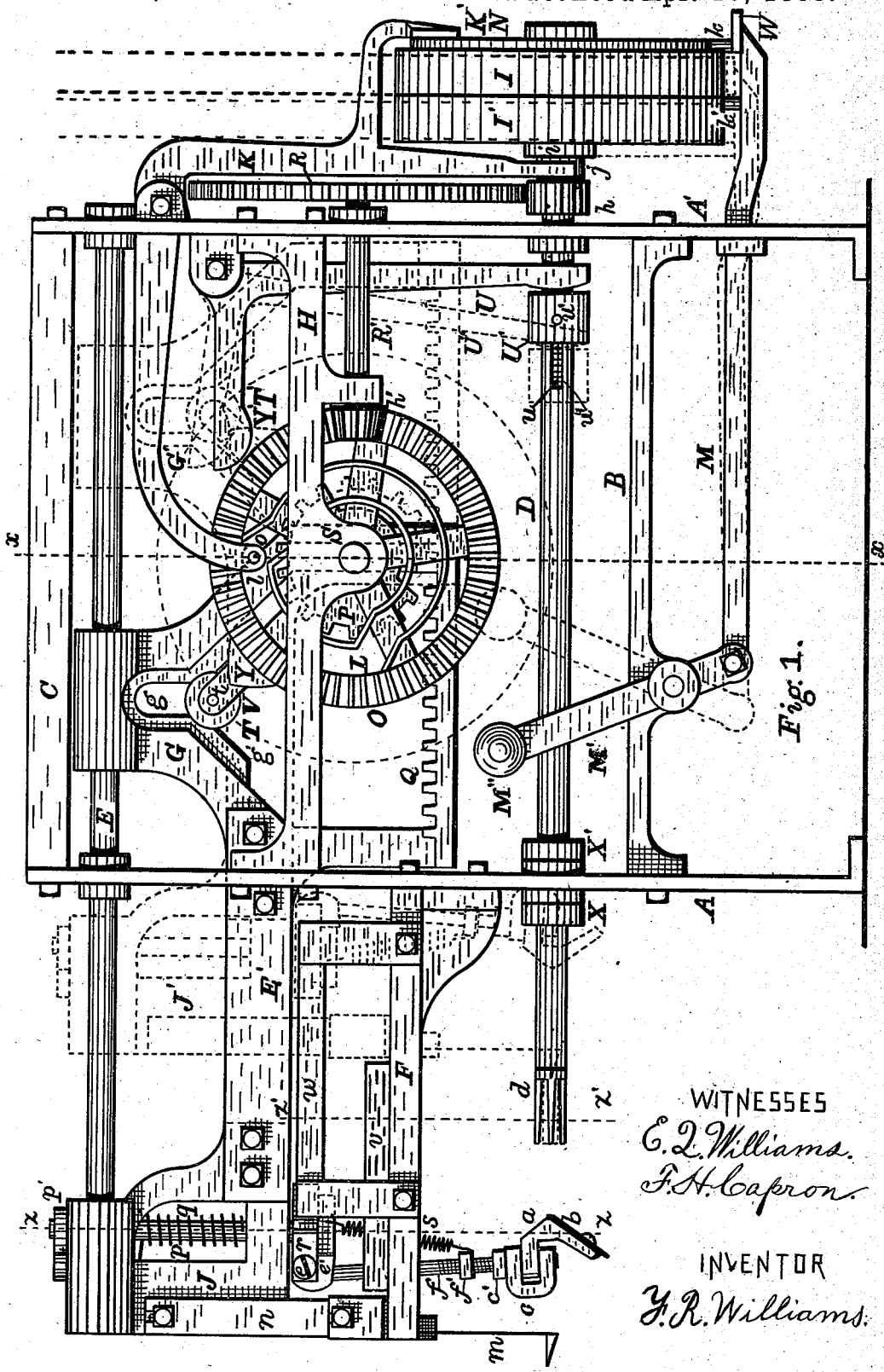

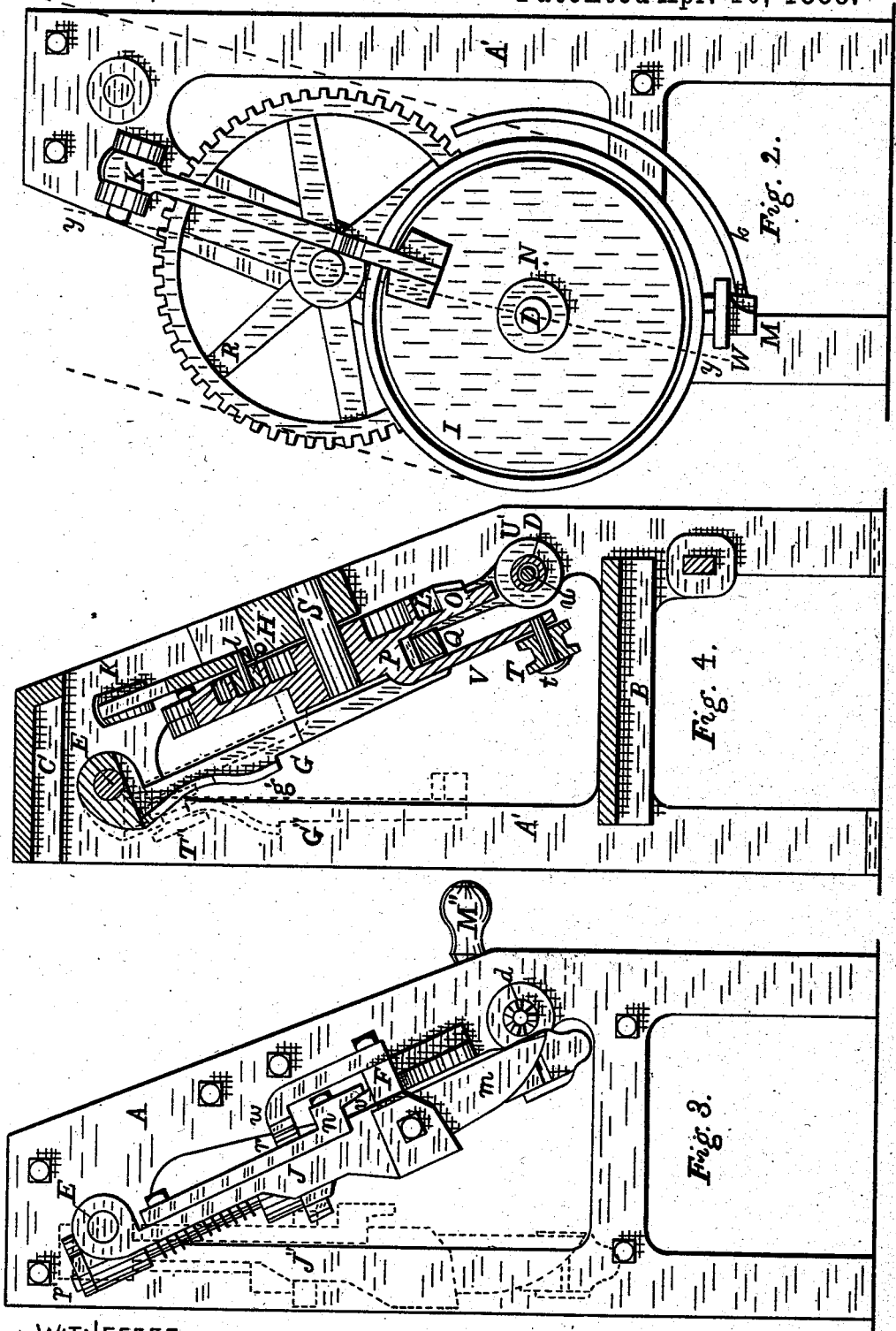

(No Model.) 3 Sheets—Sheet 3.
F. R. WILLIAMS.
APPLE PARER.
No. 381,044. Patented Apr. 10, 1888.
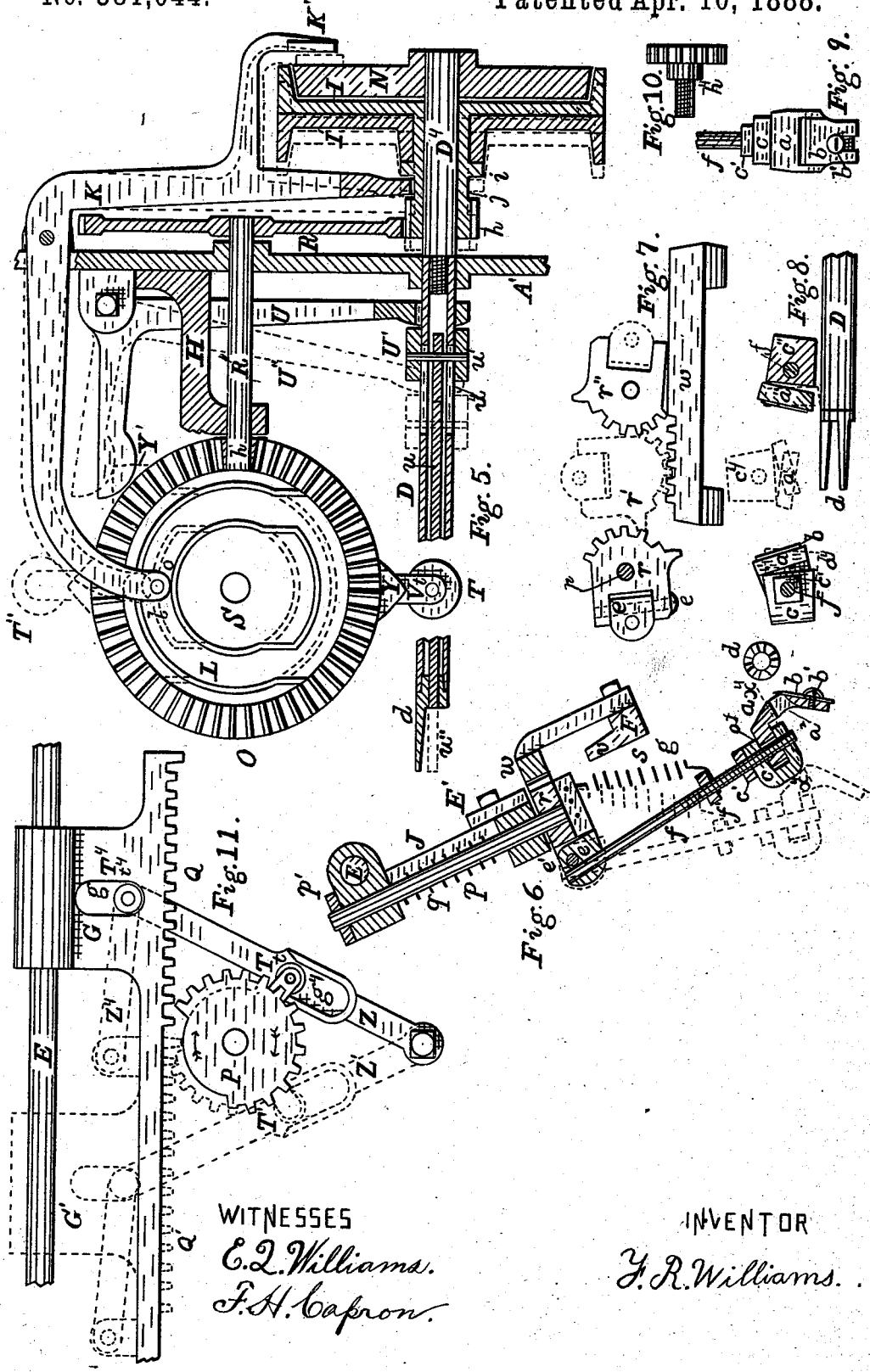
WITNESSES
E. L. Williams.
F. H. Capron.
INVENTOR
F. R. Williams.

UNITED STATES PATENT OFFICE.

FRANK R. WILLIAMS, OF ROCHESTER, NEW YORK.

APPLE-PARER.

SPECIFICATION forming part of Letters Patent No. 381,044, dated April 10, 1888.

Application filed April 24, 1885. Serial No. 163,283. (No model.)

*To all whom it may concern:*

Be it known that I, FRANK R. WILLIAMS, of Rochester, in the county of Monroe and State of New York, have invented certain new and useful Improvements in Apple-Parers; and I do hereby declare the following to be a full, clear, and exact description of the same, reference being had to the accompanying drawings, forming a part of this specification, and to the figures and letters of reference marked thereon.

My invention relates to improvements in apple-parers, and particularly to that class wherein the fruit to be operated upon is rotated by suitable mechanism, and the paring, coring, and slicing are performed by suitable mechanism reciprocating longitudinally of the axis of rotation of the fruit; and it has for its object to improve the construction of machines of this class, whereby the various operations may be performed in a more expeditious and superior manner than heretofore, and whereby, also, the operations of paring and slicing, or paring only, may be accomplished by simple mechanism and convenient movements of the operator.

The invention consists, generally, in certain well-known devices whereby the machine can be run at a greater speed than ordinarily, and at the same time will provide for removing all of the skin of the fruit, and, if desired, at the same time cut it into suitable form to adapt it to be "evaporated" or dried in an expeditious manner.

It further consists in an improved arrangement of paring devices whereby the variations in shape and size of different fruits operated upon (within, of course, certain limits) may be very great, and yet the mechanism will pare and slice such fruit in the same manner that ordinary machines will fruit of normal size, or of a size which they are especially adapted to operate upon.

It further consists in devices for operating the knife or cutting-blade frame or carriage more positively and certainly than heretofore, and in certain novelties of construction and combinations of parts, all of which I will now proceed to describe, and point out particularly in the claims at the end of this specification.

In the accompanying drawings, Figure 1 is a front elevation of an apple-parer constructed in accordance with my invention; Fig. 2, an end view of the same, looking from the right; Fig. 3, a similar view looking from the left; Fig. 4, a transverse vertical sectional view taken on the line *x x* of Fig. 1, looking toward the right; Fig. 5, a longitudinal vertical sectional view on the line *y y* of Fig. 2; Fig. 6, a vertical sectional view taken through the paring-knife frame, and showing in dotted lines the position said knife and frame assume when operating upon a fruit at its greatest diameter. Fig. 7 is a top plan view of the gear operating the knife and its co-operating rack, showing the position of the frame just before the knife engages the fruit, in dotted lines the position it assumes during the paring operation, and in full lines to the right its position when the paring is finished; Fig. 8, a top plan view of the fruit-holding fork and the paring-knife in those positions corresponding to those occupied by the gear in Fig. 7; Fig. 9, a front view of the paring-knife; Fig. 10, a view of a detail; and Fig. 11 a view of a modified device for driving the knife-supporting carriage.

Similar letters of reference in the several figures indicate the same parts.

Referring to the accompanying drawings, and more particularly Fig. 1 thereof, the operating parts or mechanisms are mounted upon a main frame consisting, essentially, of end pieces, A A', preferably of metal and suitably connecting pieces or braces B and C. A suitable bracket or brace, H, is also provided, extending across between the two end pieces, to which is secured a short metal stud-axle, S, upon which the operating-gear O is mounted, as will be presently described, and in a bearing, *h'*, in this brace H a horizontal shaft, R', is supported, by means of which motion is communicated from the main driving-shaft to the gear O.

D represents a shaft supported in suitable bearings in the side pieces of the main frame, and prevented from longitudinal movement therein by means of collars X X', secured in either side of the piece A, as shown, and upon its outer end is secured the fork *d*, upon which the apple or other fruit is impaled. Upon the right-hand end of the shaft is secured, in any suitable manner, a large disk or drum, N, provided on its inner surface with a covering of leather or other suitable material to produce or increase the friction, and upon the portion D⁴ of the shaft D, extending beyond the frame A', is mounted a pulley or drum, I, adapted to receive motion from a belt or other suitable operating device. This pulley is adapted to revolve loosely upon the shaft, and is also capable of a limited longitudinal movement thereon. Its hub is extended, forming an elongated sleeve or bearing upon the shaft, and its inner end is provided with gear-teeth $h$, forming a pinion, as shown. Between the pinion and the main web of the pulley is a collar, $i$, formed upon or secured thereon, forming, with the end of the pinion, a groove, in which is placed a fork, $j$, of a lever, K, serving to move the pulley and sleeve longitudinally upon the shaft when desired.

I' represents an idle or loose pulley mounted upon the sleeve on I, confined between the web of I and the collar $i$, on which the belt is slipped when it is desired to bring the machine to a standstill.

It will be noted that when the pulley and sleeve are moved toward the right by suitable mechanism the face of pulley I will be pressed against the disk N and its motion communicated to the latter.

The shaft D is hollow for a portion of its length, and inside of it is located the rod $u$, capable of longitudinal movement and adapted to be operated outward, so as to project between the prongs of the fork $d$ and operate as a doffer to eject the core or fruit from the latter. As a means for operating this doffer, I provide a sleeve or collar, U', upon the shaft, with a pin, $u'$, projecting through a slot therein, engaging the rod and adapted to be moved by a lever, U, operated from some suitable portion of the machine, (preferably the gear O,) to slide the rod outward and eject the core at the proper time.

Upon the frame H, between the ends A A', is provided a short stud, S, upon which is mounted the gear O, the latter receiving motion from the main driving-pulley through the pinion mounted on the shaft R', the outer end of which is provided with a gear, R, receiving motion from the pulley I' through the pinion $h$, located on the inner end of the sleeve thereof.

Upon the face of the gear O is a cam-track, L, for operating upon a lever, K, (through a suitable lug or friction-roller, $o$, thereon,) to cause the operations of the clutch I N and the application of the brake K' to the drum N when the pulley and drum are disengaged. The end of this lever is bifurcated, it will be noted, and one portion carries the fork $j$, operating to move the pulley I longitudinally of the shaft and effect the clutching and unclutching, and the other carries the brake K', operating upon the drum, as described, when the pulley is shifted out of engagement therewith, as will readily be understood.

E represents a rod or guide supported by the end pieces of the frame and serving as a way upon which the paring and slicing apparatus travels back and forth to operate upon the fruit revolved upon the shaft. The frame carrying this paring and slicing apparatus consists of two parts—one, J, carrying the device for operating upon the fruit, and the other, G, the device upon which the mechanism for reciprocating it operates, the connection between them being formed by a brace or bar, E', as shown, although it will be readily understood that the two parts could, if desired, be located nearer together or made in one piece, and the connecting-bar thus dispensed with.

In paring-machines operating upon fruit by holding a knife in contact with them during their rotation it is desirable, when the operation of paring is completed, to return the apparatus to starting position again without moving it in proximity to the fruit-fork, so that the operator may be placing a fruit in position during this time, and therefore with this in view I locate the guide for the cutting apparatus above and to one side of the revolving fork, so that it may swing away by gravity, preferably, from proximity with the latter and be returned to its starting position.

The frames are sleeved upon the rod E and are free to swing and slide thereon. Upon the lower side of frame G is secured a rack, Q, with which a mutilated gear, P, on the main gear O engages to move the frame toward the right when it is swung over and held in engagement with it. The lower side of the upper portion of the frame G is provided with a vertical slot, $g$, the flanges $g'$ at the sides of which are preferably curved outward from the supporting-guide E, as shown. The gear P is provided upon its rear side with an arm or bracket, V, having at its outer end a lug or friction-roller, T, secured by a pin, $t$, and adapted to co-operate with the slot $g$ in the frame in a manner to be described.

Secured to one of the ends of the main frame is a projecting portion or bracket, F, having an upwardly-projecting flange, $v$, and above this a bar, $w$, having gear-teeth on its rear side, as shown, with which the pinion carrying the paring-blade engages, as will be farther on described. The frame J is provided near its outer end with a small lug or gib, $n$, which is adapted, when the frame is swung inward or toward the front of the machine, to engage the flange $v$ and hold the frame in this position during the right movement, or at least a portion thereof, so that the knife may operate upon the fruit during this time.

I have anticipated this description of a portion of the forward frame in order to more clearly describe the operation of the devices for causing the necessary movements of the parts.

The gear P and the arm V and the slot $g$ and rack Q are so situated relative to each other and the paring-blade that the gear will first engage the rack to move it toward the right-hand end of the machine, and as soon as it leaves it the arm will engage the left-hand side of the slot to return the frame to its first position to the left.

The flange v, it will be noted, terminates at about the point occupied by the gib n when the last tooth of the gear P leaves the rack Q, so that as soon as the frame ceases to move toward the right the gib will be allowed to swing back. The lug or friction-roller T may act upon the flange g' to swing the carriage back, or the same may swing back by gravity. I may, however, extend the flange v to the right, holding the carriage from swinging backward until it performs the return movement. As soon as this return movement is completed and the lug or roller at the end of arm V engages the flange g', the latter being curved, the carriage will be swung on the rod E and drawn toward the front of the machine. As soon as it reaches this position and begins to move toward the right by means of the engagement of the gear P upon the rack Q, the gib n will fit over the flange v and hold the carriage swung toward the front.

While I have shown the flange g' as extending on both sides of the slot g, I deem it necessary to employ it on the left side only, but prefer to employ it on both, as it may serve to facilitate the reversal and backward movement of the machine if from any cause this should become necessary or desirable.

It will be noted that while the operation of paring the fruit is taking place it is very desirable to move the paring-blade forward with an even and not too greatly accelerated motion, and this is accomplished by means of the gear P and rack, and at the same time it is desirable to return the carriage and knife to first position at an accelerated speed, but not at such speed as would unnecessarily wear and rack the machine, and this is accomplished by the arm on the gear and the slot in the frame G. The arm begins to operate as soon as it touches the abutment formed by the side of the slot, and from there to the point where it reaches the bottom of the slot the motion of the frame is gradually accelerated; but from this point to the end of the reciprocation the motion is gradually decreased, thereby returning the latter quickly and stopping it without a jerk, as would be the case were a weight or spring employed for the purpose. This I regard as an important feature, and therefore do not desire to be confined to the particular mechanism shown for accomplishing the result.

Having described the operation of the frame carrying the paring-knife and the general operation of the latter, I will now proceed to describe its specific details of construction and operations.

Referring more particularly to Figs. 1 and 6, the frame J is provided at its upper and lower ends with perforations, through which passes a shaft or rod, p, provided on its upper end with a washer or plate, p', to hold it in position, and upon its lower end with a gear or plate, r, constructed as shown clearly in plan in Fig. 7, having the recess on one side formed by two projecting ears, between which is pivoted a block or piece of metal, e, carrying the knife-blade by means of a transverse pivot, e'. Coiled about this rod p is a spiral spring, q, one end of which is attached to the rod and the other to some portion of the frame, tending to rotate the rod and gear toward the left, (looking from the top,) a suitable stop being provided for limiting its movement in this direction.

On the opposite side from the recess in which the block e is pivoted the plate or gear r (preferably called the "turn-table gear") is provided with a number of gear-teeth adapted to co-operate at certain times with the rack located on the bar w on the frame F, and these teeth are of uniform length or radius, with the exception of the first one, which is preferably considerably longer than the rest, curved somewhat, as shown clearly in Fig. 7, and between this and the position that the next tooth would occupy (were the teeth normal) there is no recess, but the longer one merges into or forms a continuation of the top of the next normal tooth. The end of the rack, it will be noted, is provided at its outer end with a broad recess before the teeth on the same are reached, corresponding with the top of what would form the first tooth on the gear, so that when the rack and gear are engaged the first tooth on the former engages the first recess in the latter. The teeth on the gear r extend around only a portion of its periphery, and it is provided with a straight portion which engages the plain portion of the bar w when the gear has made a half revolution, as shown clearly in the third position in Fig. 7.

Secured to the block e, pivoted on the gear, is a rod, f, preferably threaded, as shown, provided with the adjusting-nut f' and carrying at its lower end the casting on which is mounted the paring-knife. The rod, it will be observed, is capable of a swinging motion toward and from the center of the gear r, no matter in what position the latter may be, and it is drawn toward such center by a spring, s, attached at one end to the gear, as shown, and the other end adapted to be bent around the rod beneath a nut, f', which latter is capable of being screwed up and down upon the rod to adjust the tension of the spring. The forward motion of the block e and rod is limited by the former striking the gear r, as shown. The tension of the spring can further be adjusted by moving the point of attachment with the gear r nearer to or farther from the pivotal point of the rod. As this rod carries the paring-blade at its lower end and the spring is for the purpose of holding it in engagement with the fruit, it is desirable that its pressure be uniform at all portions of its movement, and in order to do this I prefer to employ the connection of spring and rod shown, for the reason that with this form of connection the leverage exerted by the spring is decreased in about the same proportion that its tension increases by reason of its extension, thus rendering it self-compensating and making the pressure it exerts upon the fruit more nearly constant at all times, all this being fully illustrated in Fig. 6. The paring-knife consists of an angular casting, $a$, having the perforations $a^x\ a^2$ through its ends, the former through which the main supporting-rod $f$ passes and providing for its attachment thereto, and the latter for the passage of the paring or skin of the fruit. At one side of the perforation $a^2$ is secured the paring knife or blade $b$ by means of a suitable screw, $b'$, and adapted to be adjusted up and down so as to project more or less from the casting, as desired; or, if desirable, it will be understood that the knife could be secured on the inner side of the casting with its edge projecting through the slot.

In order that the paring-blade may act upon the fruit at all points and conform to the irregularities in its surface, it is desirable that its carrying-casting should project it at some distance—say from five to seven eighths of an inch—in advance of the supporting-shaft, and should not be rigidly attached to its support, but should be allowed certain limited movements, and in order to accomplish this I form the perforation $a^x$, through which the rod $f$ passes, a trifle larger than the rod, so as to permit its turning freely thereon, but confine its motions somewhat by means of a loop-casting, $c$, secured to the rod in any suitable manner, preferably capable of adjustment, and adapted to be secured in adjusted position by a device, for instance, such as a clamping-nut, $c'$, as shown. The upper end of the casting $a$ is embraced by this casting $c$, as shown, and its rear end being broad its rotary motions are confined by the edges of casting $c$, as shown clearly in Fig. 8, and the object of allowing these motions is that the knife may more readily conform to the irregularities in the fruit. When starting the operation of paring, for instance, it is desirable to remove the skin from the end of the fruit, and this the knife is capable of doing, as shown to the left in Fig. 8, and when the blade is passing along the side of the fruit the supporting-casting may take either of the positions shown in the central portion of the figure or any intermediate thereof, and when the mechanism has turned the casting to the position shown at the extreme right the blade will enter the depression at this end of the fruit and remove the skin from this portion also.

To return for a moment to the operation of the shifting-lever K and its co-operating parts before describing the operation of the machine, I would mention the fact that the cam-groove in the gear O, that operates the lever K, is so positioned that the inner end of the lever is moved upward about the time the paring-knife has ceased its operations upon the fruit and is to be returned to the front of the machine again, thereby causing the wheel I and disk N to be disengaged and the brake to be applied to the latter, stopping the operation of the shaft D; but by reason of the broadening of the teeth on the pinion $h$ the balance of the mechanism is still kept in operation, and as soon as the frame and paring-knife are brought over to engage the fruit upon the fork the lever is again operated by the groove and the pulley thrown into engagement with the shaft, causing it and the fruit thereon to be revolved. The object of stopping the operation is, taken in connection with the moving of the paring-knife frame, very advantageous, in that the operator may place the fruit in position on the fork without danger of having it twisted out of his hand, and also without having the cutting-blade come in contact therewith.

From the above general description the operation of the device will be readily understood.

As before stated, the pulley I is revolved by suitable mechanism, preferably a belt, as shown, which latter is adapted, when desired, to be shifted by means of the belt-shifter M M' and $k\ k'$ to the loose pulley I'. Assuming the position of the machine to be that shown in Fig. 1, with the end of lever K just passing into the inner portion of the groove in O, operating the clutch, this throws the shaft D in gear, and supposing the fruit placed thereon, the frame G J will be drawn toward the right by the gear-rack, as described, and the end of the paring-blade, being drawn toward the fruit by the spring $s$, will come in contact with it and begin to remove the skin by the fruit revolving against it. This will tend to retard the movement of the knife, but the gear is at all times drawing it forward, and the tendency of the knife will be to move around the fruit, turning the shaft on which it is mounted; but for ordinary-sized fruit the gear $r$ (even if of ordinary dimensions) would by this time engage the rack on the bar $w$ and cause the beginning of the rotation of the gear and the connected paring-blade in a line coinciding with the surface of the fruit, the spring $s$ serving to hold the paring-blade in contact all the time; but, supposing the fruit should be of abnormal size or shape, the first tendency on the part of the knife in meeting the fruit would be to move back against the spring $s$, and then as the curve of the fruit was followed rotate the gear, so that when the gear reached the rack the second or third tooth might be presented to it, thus causing a complete rotation of the knife before it reaches the end of the fruit, causing an imperfect paring operation; but all this is obviated by providing the lengthened tooth and giving the peculiar shape to the second tooth shown, whereby, even though the gear should be pushed backward or rotate a trifle, the long tooth would strike the end of the rack and compel the proper engagement of teeth, as will be readily understood by reference to Fig. 6. All the time that the frame is moving toward the right the gear is rotating, carrying with it the knife engaged in removing the skin of the fruit, the limited motion allowed the blade-casting $a$ allowing it to conform to all the irregularities in the fruit, as indicated in Fig. 8. When the gear $r$ has made about a half-revolution against the tension of spring $p$, it will assume the position shown at the extreme right in Fig. 7, with the flat side against the plain portion of the bar $w$, and further motion will draw it backward without turning, the knife-blade casting also moving back, as in Fig. 8. During the time that this operation has been taking place the gear O has made about two-thirds of a revolution and the teeth of gear P are about leaving the rack Q. The gib $n$ then reaches the end of the flange $v$ and the frame G swings back to the position shown in dotted lines in Fig. 4. At this juncture the lever K is operated by the cam-groove, the clutch is released, and the brake applied to the shaft D, causing it to stop rotating. The cam Y, also located in gear O, engages the end of lever Y' and moves the collar U outward, ejecting the apple from the end of the fork, or the core of the same, if a coring device is applied, as will be explained. The arm V now operates to return the frames G and J to the left again in the manner described before, and then to swing the frame forward again to engage the flange $v$ and go through another similar operation, the operator having in the meantime during the cessation of the motion of the shaft D impaled another fruit upon the fork.

I have shown mounted upon the end of the frame J what is known as a "lip-slicer," $m$, adapted to be held in contact with the fruit during the operation of paring and serving to cut the same into a single thin slice, (a very convenient form for evaporating,) the tongue or lip on the end serving to cut the body of the fruit from the core, as will be readily understood. If desired, any approved form of coring device might be secured to the frame J in the same manner.

Instead of requiring the frames G and J to swing backward away from the fruit-shaft D, I may dispense with the flanges $g'$ at the side of the slot $g$, and modify the construction of the arm so as to perform only the return reciprocation movement, bringing the frame to starting position at the left, and may extend the flange $v$, with which the gib $n$ engages, so that it shall remain in engagement with it all the time and prevent any backward movement; or I may lengthen the flange $v$ at the right end and permit the frame to drop back only at the left end, so as to permit of the application of a fruit to the fork or for any other purpose.

Various modifications of the means for operating the carriage or frames G and J back and forth might be devised—such, for instance, as shown in Fig. 11, in which a roller, $F^4$, on the end of a pivoted lever, Z, engages with a slot, $g^x$, in the frame G, the arm T, attached to the gear P, and having the roller $t$ engaging with a flanged recess, $g^4$, in the side of the lever, being adapted to return the frames to first position, as will be understood, the gear P operating to move them to first position or during the paring operation; or, instead of this construction, the slot might be dispensed with and a link, $Z^4$, connected at opposite ends with the lever and frame, respectively, as shown in dotted lines in said figure.

It will of course be understood that various modifications and changes might be made in the devices shown without departing from the spirit of my invention, and I therefore do not desire to be confined to the particular devices shown, as others the equivalents of them might be employed in their stead. For instance, the whole of the devices for applying power might be dispensed with and the device operated by hand, and stopped and started, when desired, without resorting to clutch devices for this purpose.

Having thus described my invention, what I claim as new is—

1. In an apple-paring machine, the combination, with the main frame and a rotary shaft for the fruit, of a reciprocating carriage carrying the paring-blade, having a rack thereon and a gear co-operating with said rack to cause the movement of the carriage in a direction to co-operate with the shaft carrying the fruit and perform the paring operation, and an arm secured to said gear co-operating with the carriage for causing its return movement, substantially as described.

2. In an apple-paring machine, the combination, with the main frame and a rotary shaft for the fruit, of a reciprocating carriage carrying the paring devices located thereon, having a rack, a gear co-operating with said rack to cause the movement of the paring devices in a direction to co-operate with the shaft carrying the fruit, and an arm mounted on the gear, of greater radius than the teeth, co-operating with the rack for operating against the carriage to return it to first position at greater speed than its first movement caused by the rack, substantially as described.

3. In an apple-parer, the combination, with the main frame and the rotary shaft to which the fruit is secured, of a reciprocating carriage, devices for reciprocating it positively in both directions, a rotary paring-blade mounted thereon, and devices upon the main frame with which the rotary paring-blade co-operates to cause a rotation of it when the carriage is moved in one direction, and means, substantially as described, for moving the blade and its operating devices out of engagement when the carriage is moved in the opposite direction, substantially as described.

4. The combination, with the main frame and the rotating shaft, of the reciprocating carriage and means for reciprocating it positively in both directions, a rotary paring-blade mounted thereon, a gear with which it is connected, a rack located on the main frame for rotating the gear and blade during the reciprocation in one direction, means for causing the disengagement of the gear and rack, and a device (such as a spring) for returning the rotary blade to its first or starting position, substantially as described.

5. The combination, with the main frame, the reciprocating carriage having means for operating upon the fruit mounted thereon, a rotating pulley, and a wheel connected therewith operating upon the carriage to positively reciprocate it in both directions and having a cam thereon, of the fruit-shaft and a clutch and brake operated by the cam on the wheel for placing said pulley and fruit-shaft in engagement during the reciprocation of the carriage in one direction and disconnecting them and applying the brake to the fruit-shaft during the reciprocation of the carriage in the other direction, substantially as described.

6. The combination, with the main frame, the shaft carrying the fruit, the reciprocating and swinging carriage having devices mounted thereon for operating upon the fruit, a rotating pulley, and a wheel connected therewith operating upon the carriage to positively reciprocate it in both directions and to swing it toward and away from the fruit-shaft and having a cam thereon, of a clutch operated by said cam and operating to connect the fruit-shaft and rotating pulley when the carriage is moved in one direction and to disconnect them when the carriage is swung away from the shaft and moving in the opposite direction, as set forth.

7. The combination, with the main frame, of the rotating shaft, the reciprocating and swinging carriage having an abutment or shoulder, the mutilated gear, the rack on the carriage, the arm on the gear having the projection co-operating with the abutment on the carriage, and the gib and flange for holding the carriage and main frame together when the former is swung into engagement, substantially as described.

8. The combination, with the main frame, the rotating shaft, the reciprocating and swinging carriage pivoted above and to one side of the shaft and carrying the paring-blade, the abutment on said carriage, and the extended curved flange, of the gear so connected with the carriage as to move it in one direction, and having the arm carrying the projection co-operating with the abutment and flange and operating to move said carriage in the opposite direction and swing it in toward the rotating shaft, and means for holding the carriage when swung in such position, substantially as described.

9. In a paring-machine, the combination, with the shaft on which the fruit is secured, a reciprocating carriage and means for reciprocating it, and a rack on the main frame, of a gear mounted on the carriage, having the extended tooth and the paring-blade mounted on said gear, substantially as described.

10. In a paring-machine, the combination, with the shaft carrying the fruit, the reciprocating carriage, means for reciprocating it, and a rack on the frame, of a gear on the carriage having the extended tooth and adapted to be rotated by the rack, the paring-blade pivoted upon the gear, and the spring for moving said blade toward the axis of the gear, substantially as described.

11. In a paring-machine, the combination, with the shaft carrying the fruit, of the reciprocating carriage and means for reciprocating it, the gear on the carriage or plate carrying the paring-blade and means for rotating it during the reciprocation of the carriage, the rod pivoted to the plate and a spring for moving it toward the center, and the paring-blade secured to said rod and permitted a limited rotary motion thereon, substantially as described.

12. The combination, with the rotary gear or plate, the rod pivoted thereto, and the spring for moving it toward the center thereof, of the casting carrying the paring-blade secured to and projecting in advance of said rod and permitting a limited rotary motion thereon, substantially as described.

13. The combination, with the rotary gear or plate, the rod pivoted thereto, and the spring for moving it toward the center thereof, of the casting carrying the paring-blade through which the rod passes loosely and projecting the knife in advance of said rod, and the loop-casting secured rigidly to the rod inclosing the end of the blade-casting and limiting its movements, substantially as described.

14. In a paring-machine, the combination, with the main frame and a rotary shaft for the fruit, of a reciprocating carriage carrying devices for operating upon the fruit during the reciprocation and having a rack thereon, a gear on the main frame co-operating with said rack to cause the movement of the carriage in one direction, and an arm secured to said gear co-operating with the carriage for causing its return movement, substantially as described.

15. In a paring-machine, the combination, with the main frame and the rotating shaft for the fruit, of the reciprocating and swinging carriage carrying devices for operating upon the fruit during the reciprocation and having a rack and a flange thereon, a gear on the frame co-operating with said rack to cause the movement of the carriage in one direction and having the arm carrying a projection adapted to move the carriage in the opposite direction by co-operating with a projection on the carriage and to swing the same toward the rotating shaft by co-operating with the flange, substantially as described.

FRANK R. WILLIAMS.

Witnesses:
F. H. CAPRON,
E. Q. WILLIAMS.